US008319889B2

(12) United States Patent
Noguchi

(10) Patent No.: US 8,319,889 B2
(45) Date of Patent: Nov. 27, 2012

(54) FRAME RATE CONVERSION APPARATUS AND METHOD

(75) Inventor: Hiroshi Noguchi, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 1 day.

(21) Appl. No.: 13/142,735

(22) PCT Filed: Oct. 7, 2010

(86) PCT No.: PCT/JP2010/067674
§ 371 (c)(1),
(2), (4) Date: Jun. 29, 2011

(87) PCT Pub. No.: WO2011/043433
PCT Pub. Date: Apr. 14, 2011

(65) Prior Publication Data
US 2011/0267536 A1 Nov. 3, 2011

(30) Foreign Application Priority Data
Oct. 8, 2009 (JP) ................ P2009-234125

(51) Int. Cl.
*H04N 7/01* (2006.01)
(52) U.S. Cl. .......... 348/441; 348/448; 348/452
(58) Field of Classification Search ........ 348/441, 348/443, 447–448, 451, 452, 458, 459, 699, 348/701, 402.1, 413.1, 416.1; 382/236; 375/240.15, 375/240.16; *H04N 7/01*
See application file for complete search history.

(56) References Cited

U.S. PATENT DOCUMENTS

| 7,349,475 B2* | 3/2008 | Itoh et al. .............. 375/240.16 |
|---|---|---|
| 7,586,540 B2* | 9/2009 | Ogino et al. .............. 348/448 |
| 2003/0174777 A1 | 9/2003 | Itoh et al. |
| 2006/0092321 A1 | 5/2006 | Ogino et al. |
| 2007/0002058 A1 | 1/2007 | Wittebrood |
| 2007/0092111 A1 | 4/2007 | Wittebrood et al. |
| 2007/0153903 A1 | 7/2007 | Itoh et al. |
| 2007/0153904 A1 | 7/2007 | Itoh et al. |
| 2007/0165719 A1 | 7/2007 | Itoh et al. |

(Continued)

FOREIGN PATENT DOCUMENTS

JP 07-336650 A 12/1995

(Continued)

OTHER PUBLICATIONS

Supplementary European Search Report, Application No. EP 10 82 2103, dated Apr. 23, 2012, eight (8) pages.

*Primary Examiner* — Trang U Tran
(74) *Attorney, Agent, or Firm* — Nath, Goldberg & Meyer; Jerald L. Meyer; Stanley N. Protigal

(57) ABSTRACT

Correlation detectors 21 and 22 employ two different correlation detecting methods to determine correlations. Correlation comparators 23 and 24 output correlation values DF1 and DF2, and motion vectors MV1 and MV2 in directions representing largest correlation values. A correlation comparator 25 selects one of the motion vectors larger in correlation, as a motion vector MV3, to output an interpolation control signal FS1 to determine an interpolation method at an interpolator 3. The interpolator 3 is operative in accordance with the interpolation control signal FS1, to select any one out of two different one-side interpolations and a both-side interpolation, to generate interpolation pixel data fp0.

8 Claims, 8 Drawing Sheets

U.S. PATENT DOCUMENTS

| | | |
|---|---|---|
| 2009/0110075 A1 * | 4/2009 | Chen et al. ............... 375/240.16 |
| 2009/0147853 A1 | 6/2009 | Dane et al. |

FOREIGN PATENT DOCUMENTS

| | | |
|---|---|---|
| JP | 8-191448 A | 7/1996 |
| JP | 2000-134585 A | 5/2000 |
| JP | 2003-47011 A | 2/2003 |
| JP | 2003-274414 A | 9/2003 |
| JP | 2004-320279 A | 11/2004 |
| JP | 2006-270823 A | 10/2006 |
| JP | 2006-331136 A | 12/2006 |
| JP | 2007-504700 A | 3/2007 |
| JP | 2007-506333 A | 3/2007 |
| JP | 2009-118456 A | 5/2009 |
| WO | 99/57906 A1 | 11/1999 |
| WO | 2006/012382 A1 | 2/2006 |

* cited by examiner

FIG. 6

| Sj3 | Scp0 | FS1 |
|-----|------|-----|
| 0   | 0    | 10  |
| 0   | 1    | 01  |
| 1   | 0    | 11  |
| 1   | 1    | 11  |

FRAME RATE CONVERSION APPARATUS AND METHOD

This is a National Phase Application filed under 35 U.S.C. 371 as a national stage of PCT/JP2010/067674, filed on Oct. 7, 2010, an application claiming the benefit from Japanese Application No. P2009-234125 filed on Oct. 8, 2009, the entire content of each of which is hereby incorporated by reference in its entirety.

TECHNICAL FIELD

The present invention relates to a system and a method for frame rate conversion adapted for use of motion vectors of moving images to generate interpolation pixels, interpolate interpolation frames between real frames, and make a conversion of frame rate.

BACKGROUND ART

There are image display systems using liquid crystal panels to display moving images, with tendencies to produce afterimages. To this point, for reduction of afterimages, there is use of interpolation frames to be interpolated between real frames of picture signals, for increasing frames in number, converting e.g. a vertical frequency of 60 Hz in frame rate to a vertical frequency of 120 Hz being a double, or more, to display images. In picture signal processors adapted for frame rate conversion, there is made detection of motion vectors of images, for use of motion vectors to generate interpolation pixels, to generate interpolation frames to be interpolated between real frames.

There is Patent Literature 1 as an example describing a frame rate conversion apparatus of a motion compensating type that implements using motion vectors to generate interpolation pixels, interpolating interpolation frames between real frames to make a conversion of frame rate.

CITATION LIST

Patent Literature

Patent Literature 1: Japanese Patent Application Laying-Open Publication No. 2006-331136

SUMMARY OF INVENTION

Problem to be Solved

In frame rate conversion apparatuses of motion compensating type, there is generation of inherently non-existent images predicted from temporarily antecedent and subsequent images, with potential generation of erroneous images, that is, an occurrence of so-called erroneous interpolation. For instance, there may be differences of motion between a spatially anterior foreground and a spatially posterior background, with tendencies for erroneous interpolation to occur. Between foreground and background, there is a boundary about which erroneous detection of motion vector tends to occur, resulting in erroneous interpolation causing unnatural interpolation images with a feeling of strangeness, as an issue.

The present invention has been devised in view of such issues, and has as its object the provision of a system and a method for frame rate conversion adapted to reduce erroneous interpolation due to erroneous detection of motion vector.

Solution to Problem

According to an aspect of the present invention, as a solution to the problem described, there is a frame rate conversion apparatus comprising a first correlation detector (21) configured to detect respective correlation values between a first pixel data being a pixel data residing on a first frame, in an identical position to an interpolation pixel data on an interpolation frame to be interpolated between the first frame and a second frame previous to the first frame, and plural pixel data on the second frame, a first correlation comparator (23) configured to be operative among correlation values output from the first correlation detector, to output combination of a first largest correlation value largest in correlation thereamong and a direction representing the first largest correlation value, as a first motion vector, a second correlation detector (22) configured to detect respective correlation values between a second pixel data being a pixel data residing on the second frame, in an identical position to the interpolation pixel data, and plural pixel data on the first frame, a second correlation comparator (24) configured to be operative among correlation values output from the second correlation detector, to output combination of a second largest correlation value largest in correlation thereamong and a direction representing the second largest correlation value, as a second motion vector, a third correlation comparator (25) configured to be operative between the first motion vector and the second motion vector, to output one of the motion vectors greater in correlation between the first largest correlation value and the second largest correlation value, as a final third motion vector, a first pixel data selector (31) configured to be operative on basis of the third motion vector, to select from among plural pixel data on the first frame a third pixel data to be output as necessary for generation of the interpolation pixel data, a second pixel data selector (32) configured to be operative on basis of the third motion vector, to select from among plural pixel data on the second frame a fourth pixel data to be output as necessary for generation of the interpolation pixel data, an interpolation pixel data generator (34) configured to select any one of a one-side interpolation simply using the third pixel data, a one-side interpolation simple using the fourth pixel data, and a both-side interpolation using the third and the fourth pixel data, to generate and output the interpolation pixel data, and a frame rate converter (4) configured for use of the interpolation pixel data to generate the interpolation frame, to interpolate between the first frame and the second frame, to implement a conversion of frame rate.

Here, it is preferable that the third correlation comparator is configured to be operative when meeting a first condition that the first motion vector and the second motion vector have a difference in between within a prescribed range, to output a signal on determination to have the both-side interpolation as an interpolation at the interpolation pixel data generator, and the interpolation pixel data generator is configured to be operative with the signal on determination input thereto, to average the third and the fourth pixel data, to generate the interpolation pixel data.

Also, it is preferable that the third correlation comparator is configured to be operative when meeting a second condition that the first motion vector and the second motion vector have a difference in between within a prescribed range, and the first largest correlation value and the second largest correlation value have a difference in between smaller in absolute value than a first threshold, to output a signal on determination to have the both-side interpolation as an interpolation at the interpolation pixel data generator, and the interpolation pixel data generator is configured to be operative with the signal on determination input thereto, to average the third and the fourth pixel data, to generate the interpolation pixel data.

Further, it is preferable that the third correlation comparator is configured to be operative also when meeting, besides the second condition, a third condition that the first largest correlation value and the second largest correlation value have a difference in between smaller in absolute value than a second threshold being a smaller value than the first threshold, to output a signal on determination to have the both-side interpolation as an interpolation at the interpolation pixel data generator.

Further, according to an aspect of the present invention, as a solution to the problem described, there is a frame rate conversion method comprising a first correlation detecting step of detecting respective correlation values between a first pixel data being a pixel data residing on a first frame, in an identical position to an interpolation pixel data on an interpolation frame to be interpolated between the first frame and a second frame previous to the first frame, and plural pixel data on the second frame, a first correlation comparing step of operating among correlation values detected at the first correlation detecting step, to output combination of a first largest correlation value largest in correlation thereamong and a direction representing the first largest correlation value, as a first motion vector, a second correlation detecting step of detecting respective correlation values between a second pixel data being a pixel data residing on the second frame, in an identical position to the interpolation pixel data, and plural pixel data on the first frame, a second correlation comparing step of operating among correlation values detected at the second correlation detecting step, to output combination of a second largest correlation value largest in correlation thereamong and a direction representing the second largest correlation value, as a second motion vector, a third correlation comparing step of operating between the first motion vector and the second motion vector, to output one of the motion vectors greater in correlation between the first largest correlation value and the second largest correlation value, as a final third motion vector, a first pixel data selecting step of operating on basis of the third motion vector, to select from among plural pixel data on the first frame a third pixel data to be output as necessary for generation of the interpolation pixel data, a second pixel data selecting step of operating on basis of the third motion vector, to select from among plural pixel data on the second frame a fourth pixel data to be output as necessary for generation of the interpolation pixel data, an interpolation pixel data generating step of selecting any one of a one-side interpolation simply using the third pixel data, a one-side interpolation simple using the fourth pixel data, and a both-side interpolation using the third and the fourth pixel data, to generate and output the interpolation pixel data, and a frame rate converting step of using the interpolation pixel data to generate the interpolation frame, to interpolate between the first frame and the second frame, to implement a conversion of frame rate.

Here, it is preferable that the third correlation comparing step comprises operating when meeting a first condition that the first motion vector and the second motion vector have a difference in between within a prescribed range, to output a signal on determination to have the both-side interpolation as an interpolation at the interpolation pixel data generating step, and the interpolation pixel data generating step comprises operating with the signal on determination input thereto, to average the third and the fourth pixel data, to generate the interpolation pixel data.

Also, it is preferable that the third correlation comparing step comprises operating when meeting a second condition that the first motion vector and the second motion vector have a difference in between within a prescribed range, and the first largest correlation value and the second largest correlation value have a difference in between smaller in absolute value than a first threshold, to output a signal on determination to have the both-side interpolation as an interpolation at the interpolation pixel data generating step, and the interpolation pixel data generating step comprises operating with the signal on determination input thereto, to average the third and the fourth pixel data, to generate the interpolation pixel data.

Further, it is preferable that the third correlation comparing step comprises operating also when meeting, besides the second condition, a third condition that the first largest correlation value and the second largest correlation value have a difference in between smaller in absolute value than a second threshold being a smaller value than the first threshold, to output a signal on determination to have the both-side interpolation as an interpolation at the interpolation pixel data generating step.

ADVANTAGEOUS EFFECT OF INVENTION

According to the present invention, there is a system as well as a method for frame rate conversion adapted to reduce erroneous interpolation due to erroneous detection of motion vector, allowing for a conversion of frame rate to obtain natural images with a reduced feeling of strangeness.

BRIEF DESCRIPTION OF DRAWINGS

FIG. 6 is a diagram describing operations of the correlation comparator 25 shown in FIG. 5.

EMBODIMENTS OF THE INVENTION

Figure 1:
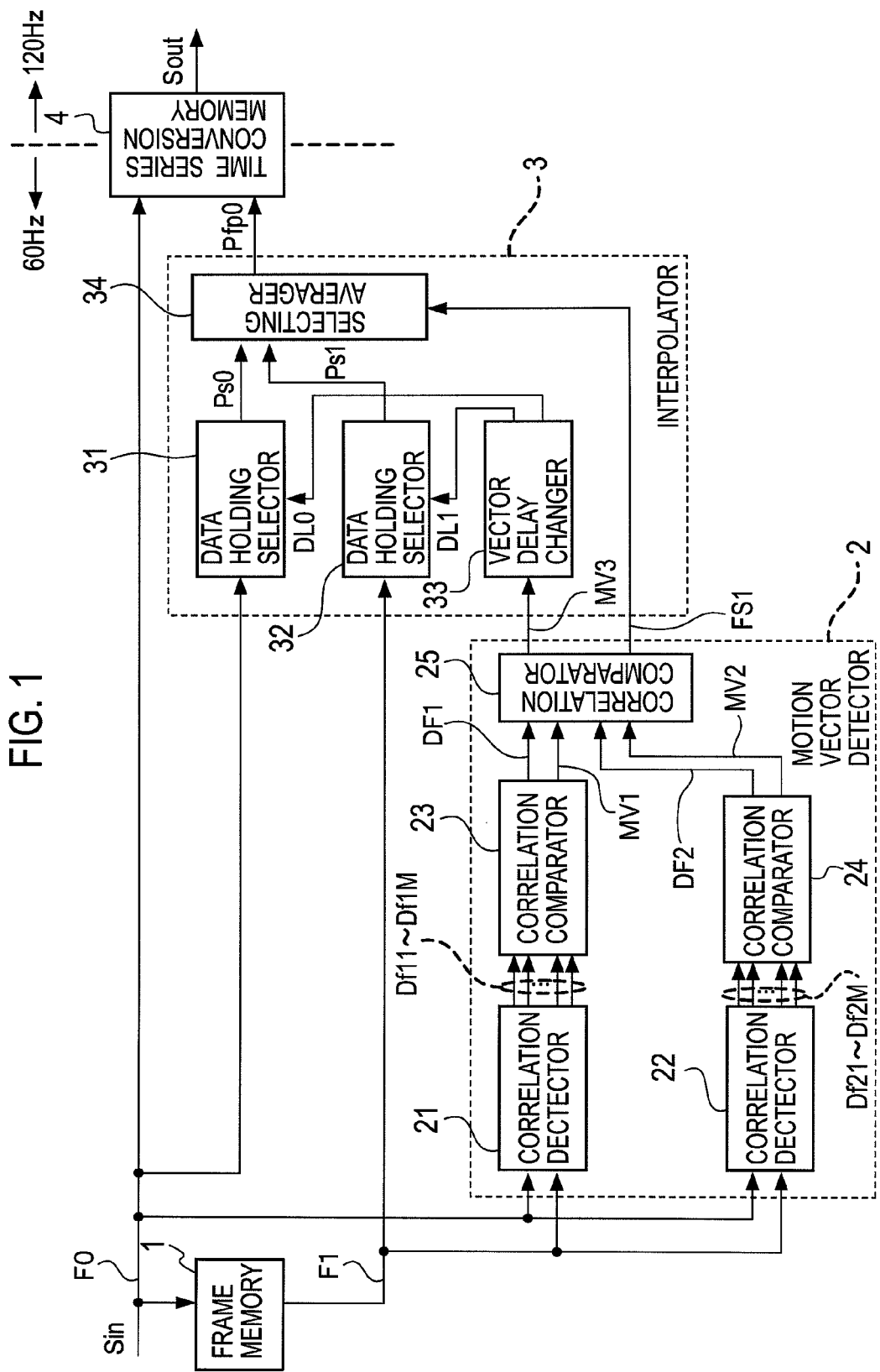
FIG. 1 is a block diagram showing a frame rate conversion apparatus according to an embodiment of the present invention.

There will be described a system and a method for frame rate conversion according to an embodiment of the present invention, with reference to the accompanying drawings. In FIG. 1, given a picture signal Sin with a frame frequency of 60 Hz, it has a sequence of pixel data each respectively input to a frame memory 1, a motion vector detector 2, an interpolator 3, and a time series conversion memory 4. The frame memory 1 has input pixel data delayed by 1 frame to output. Letting F0 be a current frame of picture signal Sin input thereto, and F1 be a frame output from the frame memory 1 as a 1-frame previous one to the current frame. The frame F1 has a sequence of pixel data input to the motion vector detector 2, and the interpolator 3.

Figure 2:
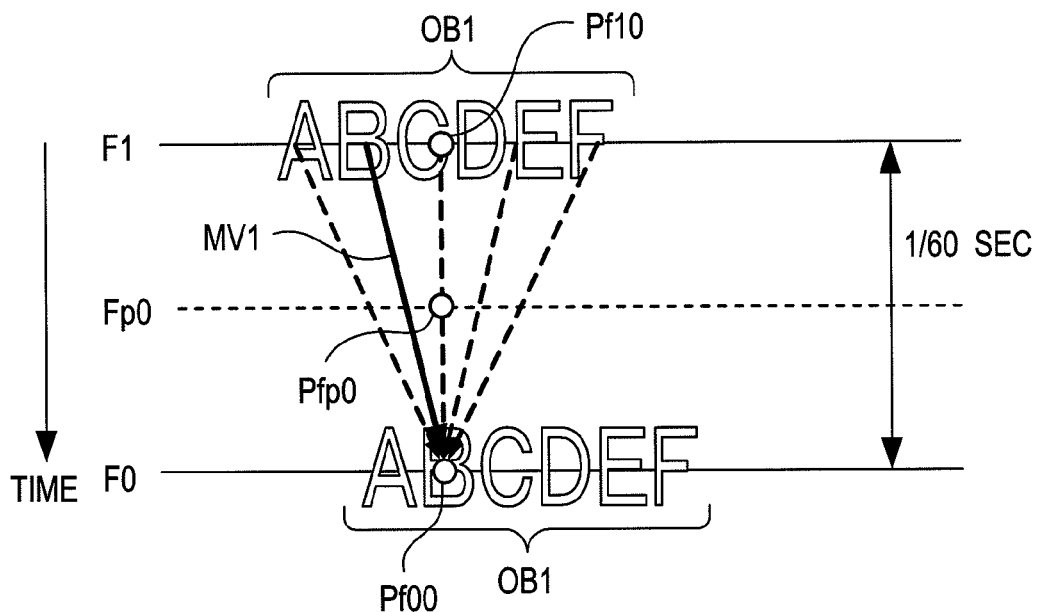
FIG. 2 is an illustration describing a first correlation detecting method employed in an embodiment.

The motion vector detector 2 includes a combination of correlation detectors 21 and 22 and correlation comparators 23 to 25. One correlation detector 21 employs a first correlation detecting method illustrated in FIG. 2, to detect correlations in a plurality of directions. Referring to FIG. 2, description is now made of the first correlation detecting method at the correlation detector 21. FIG. 2 illustrates a combination of objects OB1 composed of character images of "A B C D E F" being in horizontal movement in neighboring frames F1 and F0. There is a frame Fp0 to be interpolated as an interpolation frame between the frames F1 and F0. For generation of interpolation pixel data Pfp0 on the interpolation frame Fp0, motion vectors are to be determined, as necessary, for which, as illustrated in FIG. 2, difference values are produced in a plurality of directions. In a narrow sense, each difference value is determined as an absolute value of difference between luminance values of pixel data, which is referred herein to simply as a difference value.

In FIG. 2, for an interpolation pixel data Pfp0, the frame F0 has a pixel data Pf00 residing thereon in identical horizontal and vertical positions, fixed as a pixel data after movement, and the frame F1 has thereon a plurality of pixel data set as pixel data before movement respectively. The frame F1 has the pixel data before movement as pixel data thereon within a prescribed range centered on a pixel data Pf10 residing in identical horizontal and vertical positions to the interpolation pixel data Pfp0. It is noted that, for simplification, on the frame F1 simply the pixel data Pf10 is denoted by a round mark, omitting round marks for other pixel data. The correlation detector 21 determines respective difference values Df11 to Df1M between the pixel data Pf00 and a plurality of pixel data on the frame F1. As illustrated in FIG. 1, the difference values Df11 to Df1M are input to one correlation comparator 23. The difference values Df11 to Df1M may be each referred to as a correlation value, too. The smaller in difference value the larger in correlation, and the larger in difference value the smaller in correlation.

The correlation comparator 23 is operable for comparison of magnitude among the difference values Df11 to Df1M, to output a direction representing the smallest value, as a motion vector MV1, together with a smallest difference value, i.e., a difference value the motion vector MV1 has, as DF1. It has the smallest difference value DF1 in the direction where the correlation is largest. The smallest difference value DF1 is a largest correlation value. In FIG. 2, the pixel data Pf00 is connected with plural pixel data on the frame F1 by broken lines, which represent candidate vectors else than the selected motion vector MV1. The correlation comparator 23 thus outputs a combination of motion vector MV1 and difference value DF1, which is supplied to another correlation comparator 25.

Figure 3:
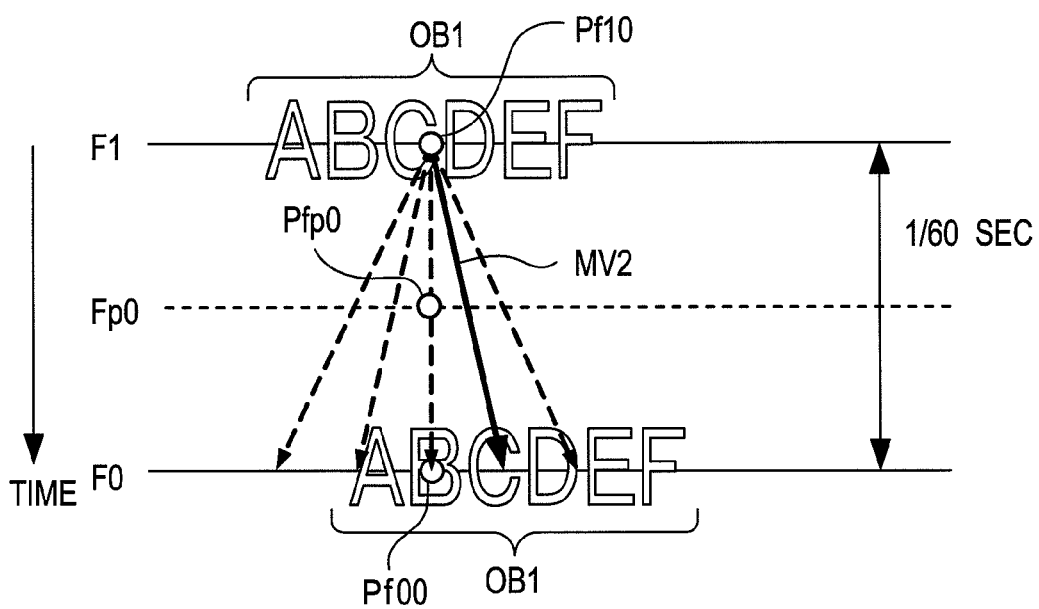
FIG. 3 is an illustration describing a second correlation detecting method employed in an embodiment.

The other correlation detector 22 employs a second correlation detecting method illustrated in FIG. 3, to detect correlations in a plurality of directions. Referring to FIG. 3, description is now made of the second correlation detecting method at the correlation detector 22. FIG. 3 illustrates the objects OB1 composed of character images of "A B C D E F" being in horizontal movement in the neighboring frames F1 and F0. For the generation of interpolation pixel data Pfp0 on the interpolation frame Fp0, motion vectors are to be determined, as necessary, for which, as illustrated in FIG. 3, difference values are produced in a plurality of directions.

In FIG. 3, for the interpolation pixel data Pfp0, the frame F1 has a pixel data Pf10 residing thereon in identical horizontal and vertical positions, fixed as a pixel data before movement, and the frame F0 has thereon a plurality of pixel data set as pixel data after movement respectively. The frame F0 has the pixel data after movement as pixel data thereon within a prescribed range centered on the pixel data Pf00 residing in identical horizontal and vertical positions to the interpolation pixel data Pfp0. It is noted that, for simplification, on the frame F0 simply the pixel data Pf00 is denoted by a round mark, omitting round marks for other pixel data. The correlation detector 22 determines respective difference values Df21 to Df2M between the pixel data Pf10 and a plurality of pixel data on the frame F0. As illustrated in FIG. 1, the difference values Df21 to Df2M are input to another correlation comparator 24. The difference values Df21 to Df2M may be each referred to as a correlation value, as described.

The correlation comparator 24 is operable for comparison of magnitude among the difference values Df21 to Df2M, to output a direction representing the smallest value, as a motion vector MV2, together with a smallest difference value (as a largest correlation alue), i.e., a difference value the motion vector MV2 has, as DF2. In FIG. 3, the pixel data Pf10 is connected with plural pixel data on the frame F0 by broken lines, which represent candidate vectors else than the selected motion vector MV2. The correlation comparator 24 thus outputs a combination of motion vector MV2 and difference value DF2, which is supplied to the correlation comparator 25.

In FIG. 2 as well as in FIG. 3, there is an implementation of defining a pair of pixel data to determine a difference value in between to detect a correlation, which may be replaced by defining blocks including plural pixel data, followed by determining difference values for each of them for their integration to provide a difference sum in absolute value to be based on to determine a correlation. The detection method of correlation may be arbitrary.

Figure 4:
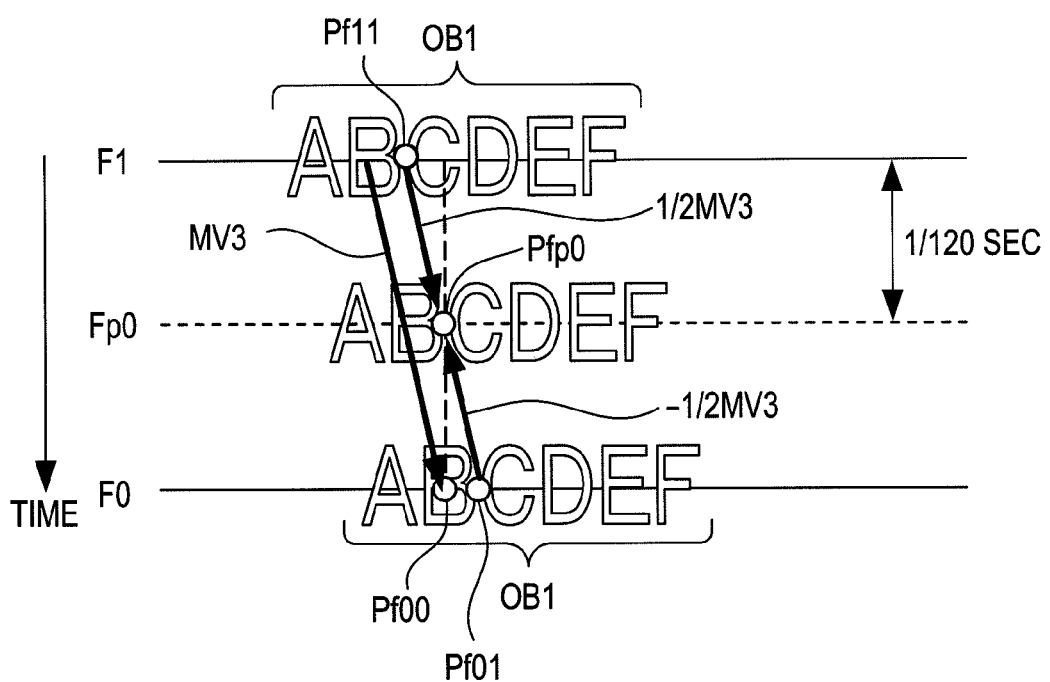
FIG. 4 is an illustration describing interpolation vectors based on motion vectors.

The correlation comparator 25 is operative on the bases of motion vectors MV1 and MV2 and difference values DF1 and DF2, to generate and output a final motion vector V3, and an interpolation control signal FS1 for use to determine a method of interpolation at the interpolator 3. Assuming the motion vector MV3 to be such a vector as illustrated in FIG. 4, for the generation of interpolation pixel data Pfp0, there is produced a pair of interpolation vectors as combination of a vector ($\frac{1}{2}$)×MV3 (referred herein to as '$\frac{1}{2}$ MV3') extending from the pixel data Pf11 on the frame F1 to the interpolation pixel data Pfp0, and a vector ($-\frac{1}{2}$)×MV3 (referred herein to as '$-\frac{1}{2}$ MV3') extending from the pixel data Pf01 on the frame F0 to the interpolation pixel data Pfp0.

In this embodiment, the interpolator 3 is operative to employ an interpolation method of one-side interpolation mode simply using a pixel data on a frame F1 (for instance, the pixel data Pf11 in FIG. 4), an interpolation method of one-side interpolation mode simply using a pixel data on a frame F0 (for instance, the pixel data Pf01 in FIG. 4), or an interpolation method of both-side interpolation mode making an average between pixel data on the frame F1 and pixel data on the frame F0 to provide a new pixel data, whichever is selected in accordance with an interpolation control signal FS1 for generation of an interpolation pixel data Pfp0, as will be detailed later on.

Figure 5:
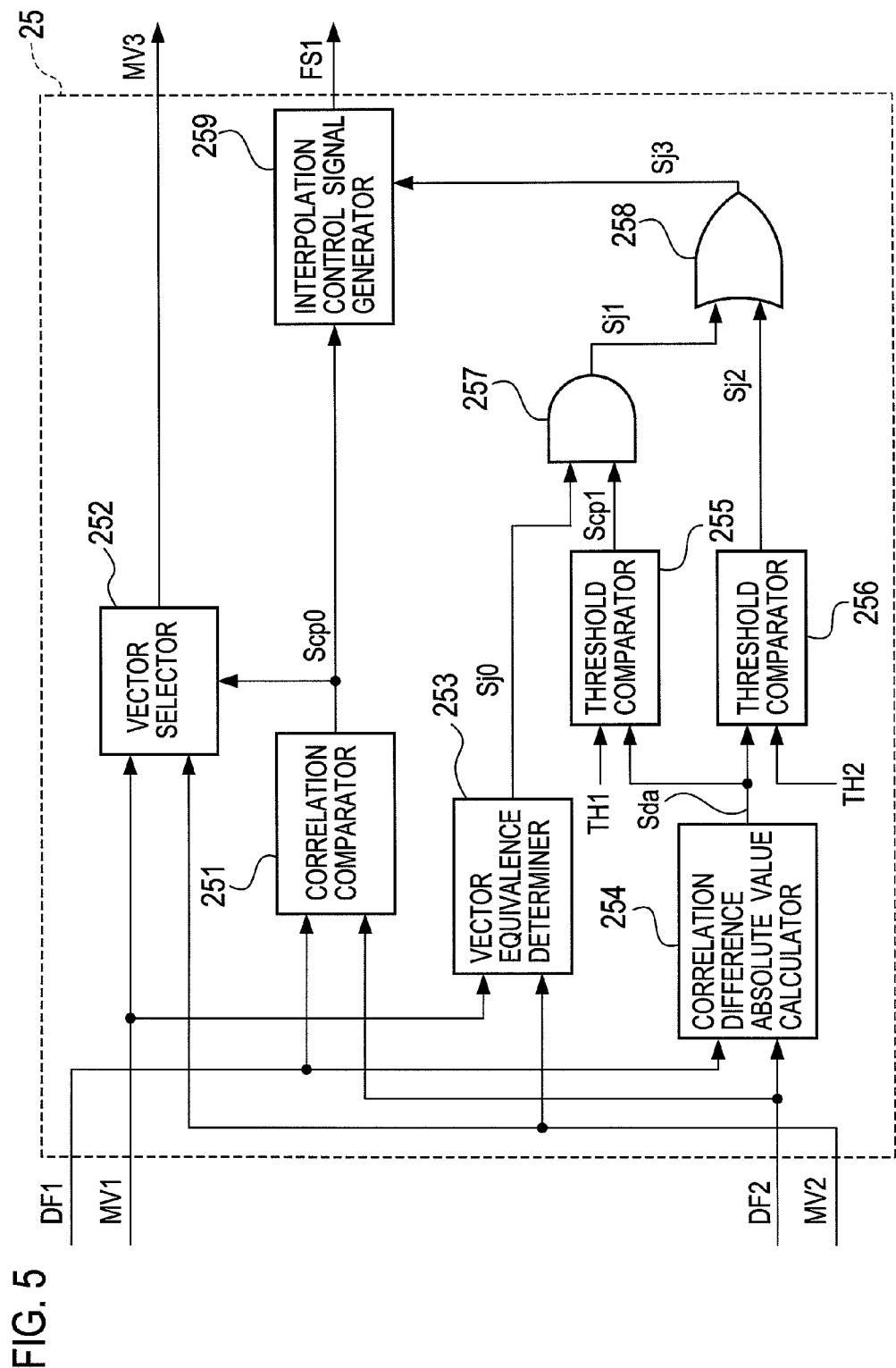
FIG. 5 is a block diagram showing a specific example of configuration of a correlation comparator 25 in FIG. 1.

Description is now made of specific configuration and actions of the correlation comparator 25, with reference to FIG. 5. As shown in FIG. 5, there is a correlation comparator 251 to which the difference values DF1 and DF2 are input, the correlation comparator 251 being operative to output a comparison signal Scp0 to be a '1' when the difference value DF2 is smaller than the difference value DF1, or a '0' as the comparison signal Scp0 in other cases. If the comparison signal Scp0 is the '0', then a vector selector 252 operates to output the motion vector MV1 as the motion vector MV3, but if the comparison signal Scp0 is the '1', it operates to output the motion vector MV2 as the motion vector MV3.

There is a vector equivalence determiner 253 to which the motion vectors MV1 and MV2 are input. The vector equivalence determiner 253 is operative to output a determination signal Sj0 to be a '1' when the motion vectors MV1 and MV2 have a difference in between within a relatively small prescribed range, or a '0' as the determination signal Sj0 in other cases. The difference between motion vectors MV1 and MV2 may be determined, for instance, as follows. It is now assumed that the motion vector MV1 has a combination of horizontal and vertical components (x1, y1), and the motion vector MV2 has a combination of horizontal and vertical components (x2, y2). x1, y1, x2, and y2 are positive or negative values. Further, it is assumed that the motion vectors MV1 and MV2 have a difference in between within the prescribed range, if (|x1-x2|, |y1-y2|) falls on or within a prescribed (a, b). Values of a, b may be set up adequate. There is a correlation difference absolute value calculator 254 to which the difference values DF1 and DF2 are input, the correlation difference absolute value calculator 254 being operative to calculate and output a difference in absolute value Sda between the difference values DF1 and DF2.

There is a threshold comparator 255, which is operative for comparison between the difference in absolute value Sda and a first threshold TH1, to output a comparison signal Scp1 to be a '1' when the difference in absolute value Sda is smaller than the first threshold TH1, or a '0' as the comparison signal Scp1 in other cases. There is a threshold comparator 256, which is operative for comparison between the difference in absolute value Sda and a second threshold TH2, to output a determination signal Sj2 to be a '1' when the difference in absolute value Sda is smaller than the second threshold TH2, or a '0' as the determination signal Sj2 in other cases. The second threshold TH2 is a value smaller than first threshold TH1.

There is an AND circuit 257, which has input thereto the determination signal Sj0 from the vector equivalence determiner 253 and the comparison signal Scp1 from the threshold comparator 255. The AND circuit 257 is operative to output a determination signal Sj1 to be a '1' when the input signals are both '1', or a '0' as the determination signal Sj1 in other cases. As will be seen from the foregoing description, the AND circuit 257 is to output the '1', if motion vectors MV1 and MV2 have a little difference in between, with a difference in absolute value Sda still relatively small, so the motion vectors MV1 and MV2 can be regarded as substantially the same. The determination signal Sj1 output from the AND circuit 257 may, for instance, be a signal serving for a both-side interpolation using the vectors ½ MV3 and −½ MV3 illustrated in FIG. 4 in a background region, for such pictures as having a stationary foreground combined with a moving background.

There is an OR circuit 258, which has input thereto the determination signal Sj1 from the AND circuit 257 and the determination signal Sj2 from the threshold comparator 256. The determination signal Sj2 is output from the threshold comparator 256, as a signal to implement a both-side interpolation, for vicinities of a boundary between background and foreground that have little different difference values DF1 and DF2. This is for avoidance of erroneous interpolation in vicinities of a boundary between background and foreground having little different difference values DF1 and DF2, where erroneous interpolation tends to occur if one-side interpolation is made. The OR circuit 258 is operative to output a determination signal Sj3 to be a '1' when at least either the determination signal Sj1 or the determination signal Sj2 is '1', or a '0' as the determination signal Sj3 when they are both '0'. This permits the determination signal Sj3 to be the '1' on background regions where both-side interpolation is desirable. Further, it permits the determination signal Sj3 to be the '1' also in vicinities of boundary where one-side interpolation is undesirable.

Figure 6:
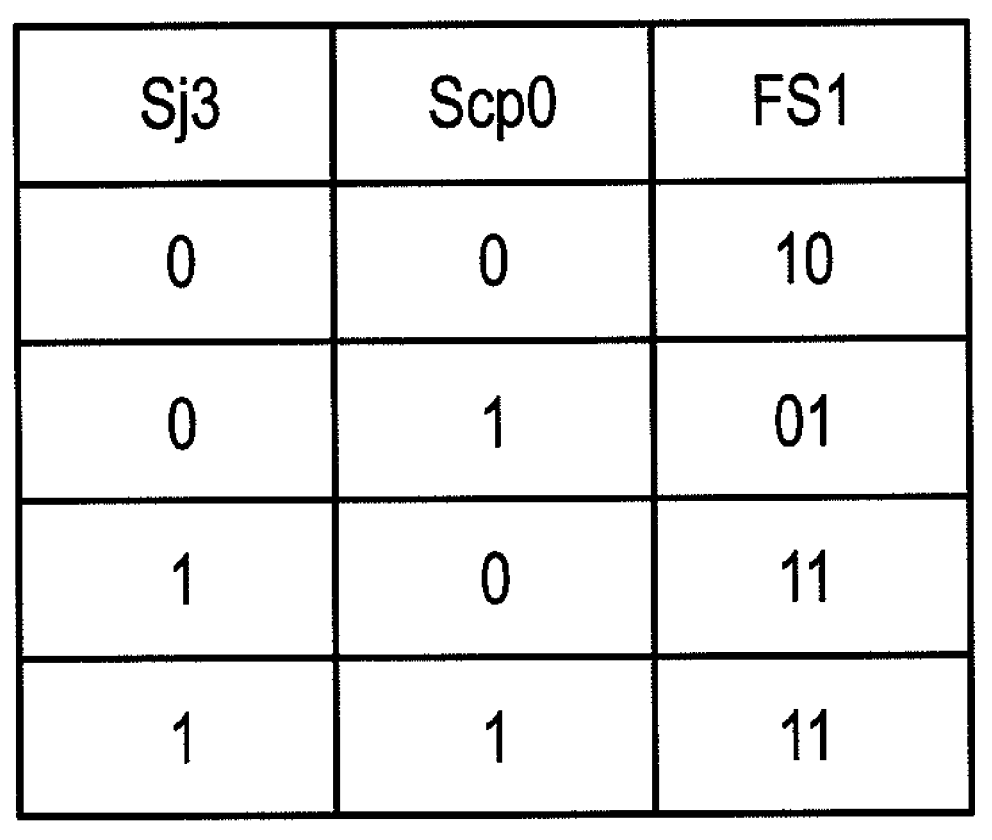

There is an interpolation control signal generator 259, which has input thereto the comparison signal Scp0 from the correlation comparator 251 and the determination signal Sj3 from the OR circuit 258. The interpolation control signal generator 259 is operative on the bases of determination signal Sj3 and comparison signal Scp0, to generate an interpolation control signal FS1 of two bits, as shown in FIG. 6. As in FIG. 6, if the determination signal Sj3 and the comparison signal Scp0 are both '0', then the interpolation control signal FS1 has a '10', but if the determination signal Sj3 is '0' and the comparison signal Scp0 is '1', then the interpolation control signal FS1 has a '01'. It has a '11' if the determination signal Sj3 is '1', irrespective of comparison signal Scp0.

Referring again to FIG. 1, the motion vector MV3 output from the correlation comparator 25 is input to a vector delay changer 33 in the interpolator 3, while the interpolation control signal FS1 is input to a select averager 34. The interpolator 3 includes a combination of data holding selectors (as pixel data selectors) 31 and 32, besides the vector delay changer 33 and the select averager 34. One data holding selector 31 holds a plurality of pixel data on the frame F0 as necessary for the generation of interpolation pixel data Pfp0. The other data holding selector 32 holds a plurality of pixel data on the frame F1 as necessary for the generation of interpolation pixel data Pfp0. The vector delay changer 33 is operative on the basis of input motion vector MV3 to produce a pair of interpolation vectors as described with reference to FIG. 4, and change the pair of interpolation vectors into a combination of delays DL0 and DL1 for the generation of interpolation pixel data Pfp0.

The vector delay changer 33 changes a vector ½ MV3 to one delay DL1, and a vector −½ MV3 to another delay DL0. The delays DL0 and DL1 are each given as a value representative of how many pixel fractions it should be delayed (shifted) in a positive or negative direction relative to the interpolation pixel data Pfp0. The delay DL0 is input to the data holding selector 31, and the delay DL1 is input to the data holding selector 32. The data holding selector 31 is operative on the basis of delay DL0, to select an arbitrary pixel data from among a plurality of pixel data on the frame F0 as they are held in advance, and the data holding selector 32 is operative on the basis of delay DL1, to select an arbitrary pixel data from among a plurality of pixel data on the frame F1 as they are held in advance In the example of FIG. 4, the pixel data Pf11 is selected at the data holding selector 31, and the pixel data Pf01 is selected at the data holding selector 32. Letting Ps0 be a pixel data selected at the data holding selector 31, and Ps1 be a pixel data selected at the data holding selector 32, the pixel data Ps0 and Ps1 are both input to the select averager 34. The select averager 34 is operative in accordance with the interpolation control signal FS1, to use one or both of the pixel data Ps0 and Ps1, to generate and output an interpolation pixel data Pfp0. The select averager 34 serves as an interpolation pixel data generator. In a narrow sense, the interpolator 3 is operative to generate an interpolation pixel data with respect to luminance and color (inclusive of color difference).

Figure 7:
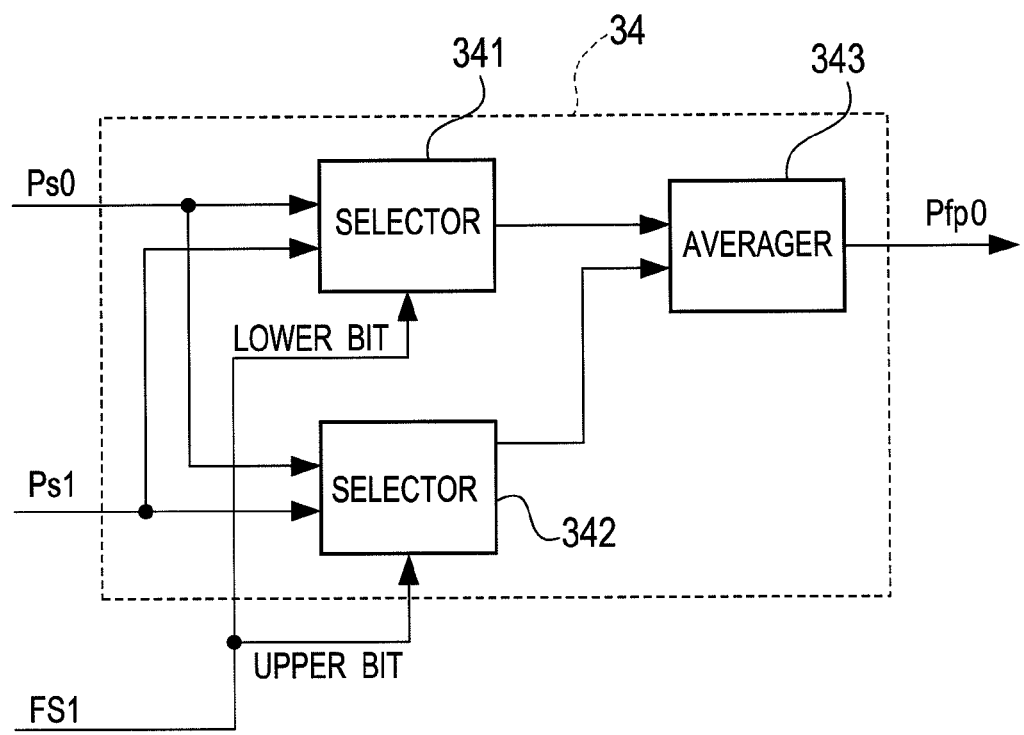
FIG. 7 is a block diagram showing a specific example of configuration of a select averager 34 in FIG. 1.

Description is now made of specific configuration and actions of the select averager 34, with reference to FIG. 7. As shown in FIG. 7, the select averager 34 includes a combination of selectors 341 and 342, and an averager 343 operative to make and output an average of outputs of the selectors 341 and 342. The pixel data Ps0 and Ps1 are input to the selectors 341 and 342, respectively. One selector 341 has a lower bit of the interpolation control signal FS1 input thereto, and the other selector 342 has an upper bit of the interpolation control signal FS1 input thereto. The selector 341 is operative to select the pixel data Ps0 when the lower bit of interpolation control signal FS1 is '1', or the pixel data Ps1 when the lower bit of interpolation control signal FS1 is '0'. The selector 342 is operative to select the pixel data Ps1 when the upper bit of interpolation control signal FS1 is '1', or the pixel data Ps0 when the lower bit of interpolation control signal FS1 is '0'.

Figure 8:
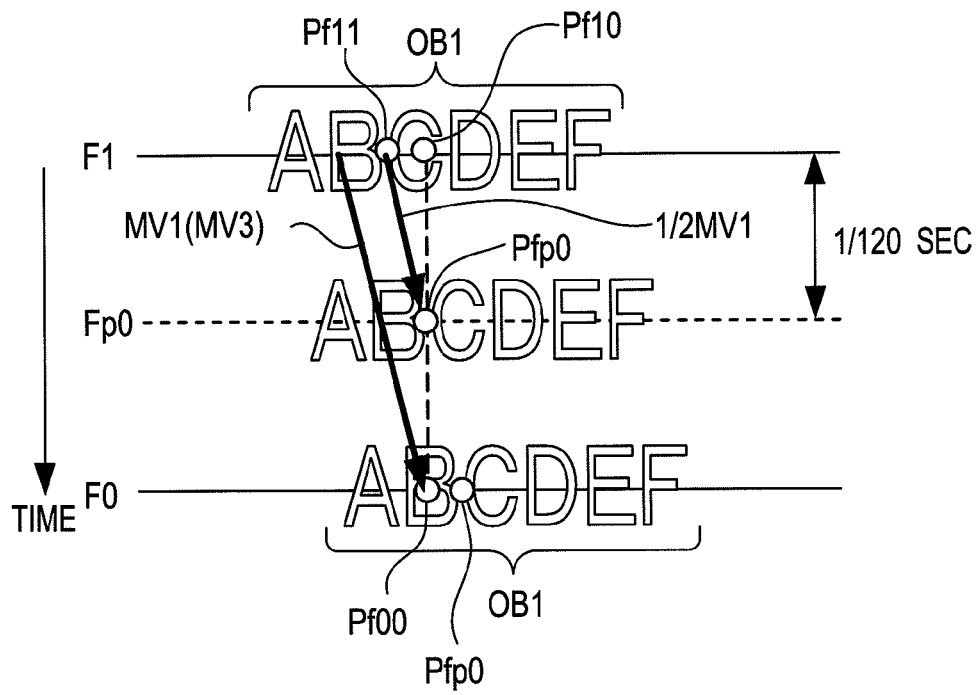
FIG. 8 is an illustration describing actions for interpolation in an embodiment.
Figure 9:
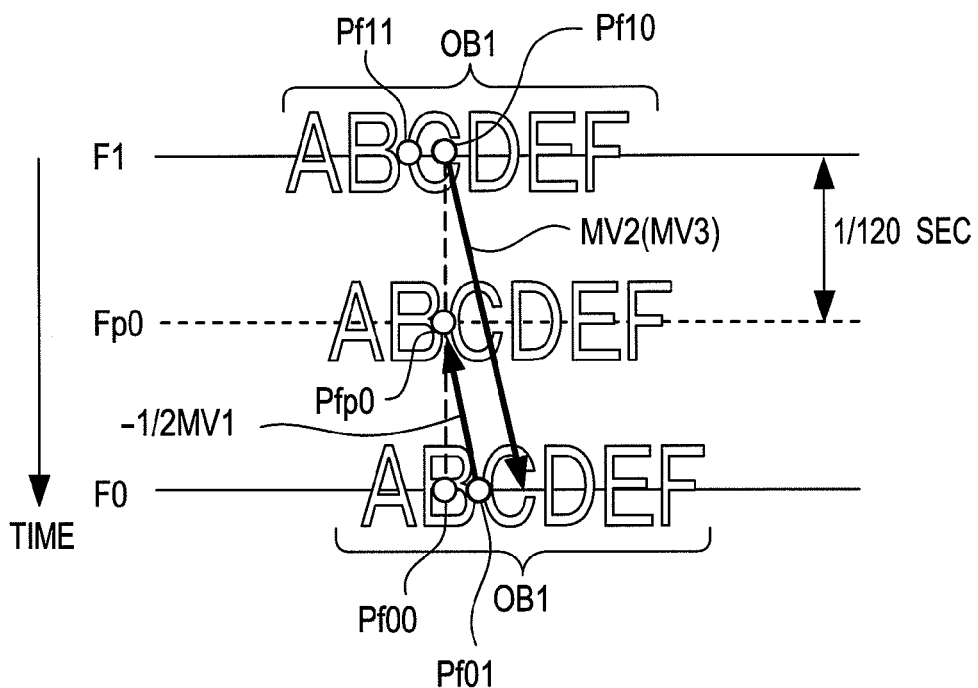
FIG. 9 is an illustration describing actions for interpolation in an embodiment.

If the interpolation control signal FS1 is '10', then both selectors 341 and 342 select and output the pixel data Ps1, so the pixel data Ps1 is output as the interpolation pixel data Pfp0 at the averager 343. If the interpolation control signal FS1 is '01', then both selectors 341 and 342 select and output the pixel data Ps0, so the pixel data Ps0 is output as the interpolation pixel data Pfp0 at the averager 343. In other words, when the interpolation control signal FS1 is '10', there is implemented a one-side interpolation using a pixel data on the frame F1 as illustrated in FIG. 8 (for instance, a pixel data Pf11 in FIG. 8). Further, when the interpolation control signal FS1 is '01', there is implemented a one-side interpolation using a pixel data on the frame F0 as illustrated in FIG. 9 (for instance, a pixel data Pf01 in FIG. 9).

If the interpolation control signal FS1 is '11', then the selector 341 selects the pixel data Ps0 and the selector 342 selects the pixel data Ps1, to output, so the averager 343 outputs a data on average between the pixel data Ps0 and the pixel data Ps1, as the interpolation pixel data Pfp0. In other words, when the interpolation control signal FS1 is '11', there is implemented a both-side interpolation using pixel data on the frames F0 and F1 as illustrated in FIG. 4 (for instance, the pixel data Pf01 and Pf11 in FIG. 4).

Referring again to FIG. 1, the time series conversion memory 4 has pixel data on a frame F0 and interpolation pixel data Pfp0 output from the interpolator 3, sequentially input thereto. The time series conversion memory 4 is operative in accordance with sequentially input pixel data on the frame F0, to generate pixel data on the frame F0 being a real frame, and in accordance with sequentially input interpolation pixel data Pfp0, to generate pixel data on an interpolation frame Fp0 being a frame for interpolation. Then, it alternately outputs both of them at 120 Hz, to thereby output a picture signal Sout with a frame frequency of 120 Hz.

Figure 10:
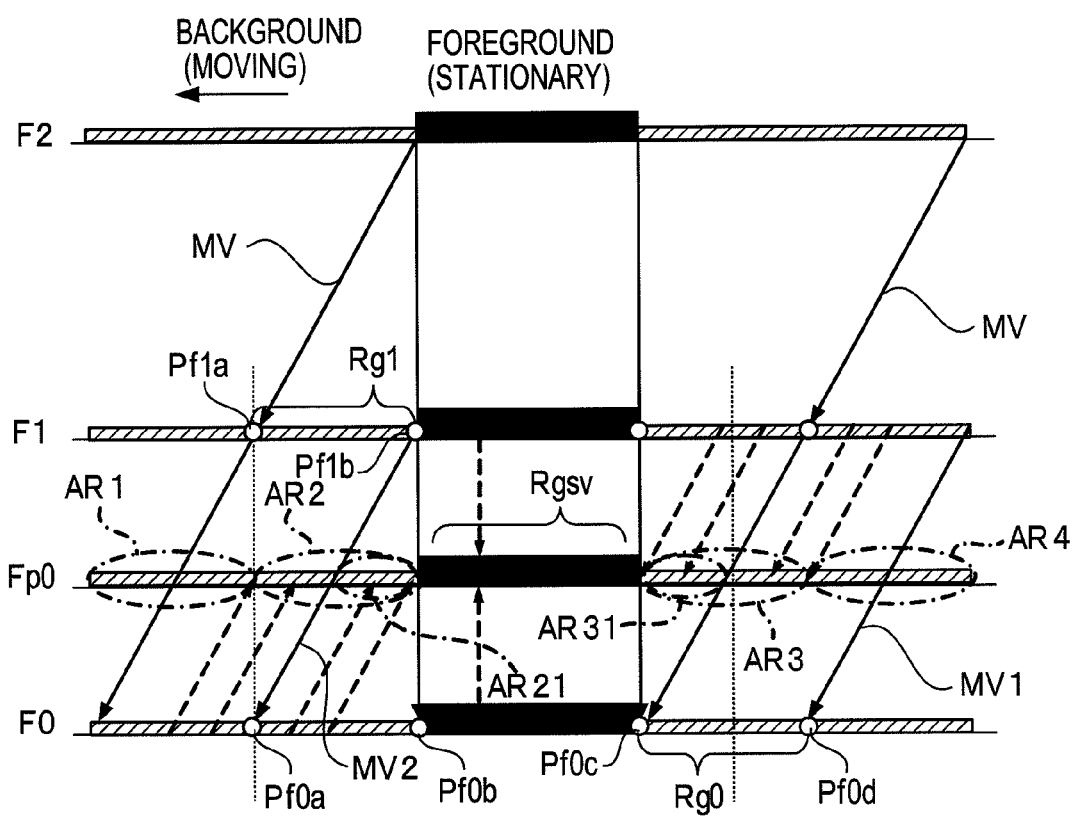
FIG. 10 is an illustration describing an effect in an embodiment.

Description is now made of advantageous effects of system and method for frame rate conversion according to the present invention, with reference to FIG. 10. FIG. 10 illustrates a situation with a stationary foreground and a horizontally moving background. In FIG. 10, there appears a frame F2 as a 1-frame previous frame to a frame F1, with motion vectors MV of the background. FIG. 10 illustrates regions AR1 and AR4 as regions on the background, the regions AR1 and AR4 having therein interpolation pixel data generated, through operations described with reference to FIG. 5 to FIG. 7, in a mode of both-side interpolation using pixel data Ps0 and Ps1 on both of frames F0 and F1.

There is a region AR2 as an adjacent region to a boundary between the foreground and the background, the region AR2 having therein interpolation pixel data generated, through operations described with reference to FIG. 5 to FIG. 7, using motion vectors selected from among motion vectors MV2 detected relative to pixel data Pf1a to Pf1b taken as base points on the frame F1. As a result, in the region AR2, interpolation pixel data are generated by a one-side interpolation that implements interpolation simply from pixel data on a frame F0, at vectors −½ MV2, as illustrated by broken line arrows. Therefore, interpolation pixel data in the region AR2 constitute an image on which an image of the background is correctly shifted from pixel data on the frame F0. There is a region Rg1 of pixel data Pf1a to Pf1b on the frame F1, which is a region of motion vectors MV2 to be selected.

There is a region AR3 likewise adjacent to a boundary between the foreground and the background, the region AR3 having therein interpolation pixel data generated, through operations described with reference to FIG. 5 to FIG. 7, using motion vectors selected from among motion vectors MV1 detected relative to pixel data Pf0c to Pf0d taken as base points on the frame F0. As a result, in the region AR3, interpolation pixel data are generated by a one-side interpolation that implements interpolation simply from pixel data on the frame F1, at vectors ½ MV1, as illustrated by broken line arrows. Therefore, interpolation pixel data in the region AR3 constitute an image on which an image of the background is correctly shifted from pixel data on the frame F1. There is a region Rg0 of pixel data Pf0c to Pf0d on the frame F0, which is a region of motion vectors MV1 to be selected. There is a region Rgsv, where interpolation is implemented by a both-side interpolation.

Further, there are regions AR21 and AR31 lying regions vicinal to boundaries in the regions AR2 and AR3, the boundary-vicinal regions AR21 and AR31 being subjected, not to any one-side interpolation, but to a both-side interpolation under specific conditions described with reference to FIG. 5 to FIG. 7. For instance, for combination of foreground and background close to each other in luminance, the regions AR21 and AR31 have difference values DF1 and DF2 as value close to each other, so in FIG. 5 the correlation comparator 251 outputs a comparison signal Scp0 unfixed to one of '0' and '1', but frequently varied between '0' and '1'. In such a situation, if the interpolation implemented is one-side mode, the regions AR21 and AR31 tend to have images deviated double in foreground. Under specific conditions described with reference to FIG. 5 to FIG. 7, the double-side interpolation implemented permits the regions AR21 and AR31 to have reduced feelings of strangeness.

Such being the case, according to the present embodiment, even on combination of foreground and background different in motion, it is possible to prevent erroneous detections of motion vectors that tend to occur in vicinities of boundary between foreground and background. It therefore is possible to reduce erroneous interpolation due to erroneous detection of motion vector, allowing for a conversion of frame rate to obtain natural images with a reduced feeling of strangeness.

According to the foregoing present embodiment, for a reduced feeling of strangeness at regions AR21 and AR31 in FIG. 10, there is provision of the combination of threshold comparator 256 and OR circuit 258 in FIG. 5, while for simplicity the threshold comparator 256 and the OR circuit 258 may be omitted. It however is preferable to provide the combination of threshold comparator 256 and OR circuit 258. It also is possible to eliminate the combination of threshold comparator 255 and AND circuit 257, to simply use the vector equivalence determiner 253 for identification of background. It however is preferable to provide the combination of threshold comparator 255 and AND circuit 257.

It is a basic to implement a both-side interpolation when meeting a first condition that the determination signal Sj0 from the vector equivalence determiner 253 is '1'. In vicinities of boundary, though it inherently is desirable to implement one-side interpolation, there does stand a both-side interpolation when motion vectors MV1 and MV2 are equivalent, as an issue, which is avoidable by the addition of threshold comparator 255. Accordingly, it is preferable to implement a both-side interpolation when meeting a second condition that the determination signal Sj0 and the comparison signal Scp1 are both '1'. Further, by addition of threshold comparator 256, it is enabled to implement a both-side interpolation also when meeting a third condition that the determination signal Sj2 is '1', allowing for reduced feelings of strangeness at the boundary-vicinal regions AR21 and AR31. There may well be a configuration to implement a both-side interpolation when meeting the first condition and the third condition.

FIG. 1 shows a system and a method for frame rate conversion according a mode of embodiment for implementing a conversion of frame rate to double, which may be a system and a method for frame rate conversion to implement a conversion of vertical frequency to a thrice or more. The present embodiment may well be applied to a film judder remover. The present invention is not restricted to the foregoing embodiment, and may be changed in various manners within a scope not departing from the summary of invention.

Industrial Applicability

As will be seen from the foregoing description, according to the present invention, there can be provision of a frame rate conversion apparatus adapted to reduce erroneous interpolation due to erroneous detection of motion vector, allowing for a conversion of frame rate to obtain natural images with a reduced feeling of strangeness.

Reference Signs List 1 frame memory
2 motion vector detector
3 interpolator
4 time series conversion memory
21, 22 correlation detector
23-25 correlation comparator
31, 32 data holding selector (pixel data selector)
33 vector delay changer
34 select averager (interpolation pixel data generator)

The invention claimed is:

1. A frame rate conversion system comprising:
a first correlation detector configured to detect respective correlation values between a first pixel data being a pixel data residing on a first frame, in an identical position to an interpolation pixel data on an interpolation frame to be interpolated between the first frame and a second frame previous to the first frame, and plural pixel data on the second frame;
a first correlation comparator configured to be operative among correlation values output from the first correlation detector, to output combination of a first largest correlation value largest in correlation thereamong and a direction representing the first largest correlation value, as a first motion vector;
a second correlation detector configured to detect respective correlation values between a second pixel data being a pixel data residing on the second frame, in an identical position to the interpolation pixel data, and plural pixel data on the first frame;
a second correlation comparator configured to be operative among correlation values output from the second correlation detector, to output combination of a second largest correlation value largest in correlation thereamong and a direction representing the second largest correlation value, as a second motion vector;
a third correlation comparator configured to be operative between the first motion vector and the second motion vector, to output one of the motion vectors greater in correlation between the first largest correlation value and the second largest correlation value, as a final third motion vector;
a first pixel data selector configured to be operative on basis of the third motion vector, to select from among plural pixel data on the first frame a third pixel data to be output as necessary for generation of the interpolation pixel data;
a second pixel data selector configured to be operative on basis of the third motion vector, to select from among plural pixel data on the second frame a fourth pixel data to be output as necessary for generation of the interpolation pixel data;
an interpolation pixel data generator configured to select any one of a one-side interpolation simply using the third pixel data, a one-side interpolation simply using the fourth pixel data, and a both-side interpolation using the third and the fourth pixel data, to generate and output the interpolation pixel data; and
a frame rate converter configured for use of the interpolation pixel data to generate the interpolation frame, to interpolate between the first frame and the second frame, to implement a conversion of frame rate.

2. The frame rate conversion system according to claim 1, wherein
the third correlation comparator is configured to be operative when meeting a first condition that the first motion vector and the second motion vector have a difference in between within a prescribed range, to output a signal on determination to have the both-side interpolation as an interpolation at the interpolation pixel data generator, and
the interpolation pixel data generator is configured to be operative with the signal on determination input thereto, to average the third and the fourth pixel data, to generate the interpolation pixel data.

3. The frame rate conversion system according to claim 1, wherein
the third correlation comparator is configured to be operative when meeting a second condition that the first motion vector and the second motion vector have a difference in between within a prescribed range, and the first largest correlation value and the second largest correlation value have a difference in between smaller in absolute value than a first threshold, to output a signal on determination to have the both-side interpolation as an interpolation at the interpolation pixel data generator, and
the interpolation pixel data generator is configured to be operative with the signal on determination input thereto, to average the third and the fourth pixel data, to generate the interpolation pixel data.

4. The frame rate conversion system according to claim 3, wherein
the third correlation comparator is configured to be operative also when meeting, besides the second condition, a third condition that the first largest correlation value and the second largest correlation value have a difference in between smaller in absolute value than a second threshold being a smaller value than the first threshold, to output a signal on determination to have the both-side interpolation as an interpolation at the interpolation pixel data generator.

5. A frame rate conversion method comprising:
a first correlation detecting step of detecting respective correlation values between a first pixel data being a pixel data residing on a first frame, in an identical position to an interpolation pixel data on an interpolation frame to be interpolated between the first frame and a second frame previous to the first frame, and plural pixel data on the second frame;

a first correlation comparing step of operating among correlation values detected at the first correlation detecting step, to output combination of a first largest correlation value largest in correlation thereamong and a direction representing the first largest correlation value, as a first motion vector;

a second correlation detecting step of detecting respective correlation values between a second pixel data being a pixel data residing on the second frame, in an identical position to the interpolation pixel data, and plural pixel data on the first frame;

a second correlation comparing step of operating among correlation values detected at the second correlation detecting step, to output combination of a second largest correlation value largest in correlation thereamong and a direction representing the second largest correlation value, as a second motion vector;

a third correlation comparing step of operating between the first motion vector and the second motion vector, to output one of the motion vectors greater in correlation between the first largest correlation value and the second largest correlation value, as a final third motion vector;

a first pixel data selecting step of operating on basis of the third motion vector, to select from among plural pixel data on the first frame a third pixel data to be output as necessary for generation of the interpolation pixel data;

a second pixel data selecting step of operating on basis of the third motion vector, to select from among plural pixel data on the second frame a fourth pixel data to be output as necessary for generation of the interpolation pixel data;

an interpolation pixel data generating step of selecting any one of a one-side interpolation simply using the third pixel data, a one-side interpolation simply using the fourth pixel data, and a both-side interpolation using the third and the fourth pixel data, to generate and output the interpolation pixel data; and a frame rate converting step of using the interpolation pixel data to generate the interpolation frame, to interpolate between the first frame and the second frame, to implement a conversion of frame rate.

6. The frame rate conversion method according to claim 5, wherein the third correlation comparing step comprises operating when meeting a first condition that the first motion vector and the second motion vector have a difference in between within a prescribed range, to output a signal on determination to have the both-side interpolation as an interpolation at the interpolation pixel data generating step, and the interpolation pixel data generating step comprises operating with the signal on determination input thereto, to average the third and the fourth pixel data, to generate the interpolation pixel data.

7. The frame rate conversion method according to claim 5, wherein the third correlation comparing step comprises operating when meeting a second condition that the first motion vector and the second motion vector have a difference in between within a prescribed range, and the first largest correlation value and the second largest correlation value have a difference in between smaller in absolute value than a first threshold, to output a signal on determination to have the both-side interpolation as an interpolation at the interpolation pixel data generating step, and the interpolation pixel data generating step comprises operating with the signal on determination input thereto, to average the third and the fourth pixel data, to generate the interpolation pixel data.

8. The frame rate conversion method according to claim 7, wherein the third correlation comparing step comprises operating also when meeting, besides the second condition, a third condition that the first largest correlation value and the second largest correlation value have a difference in between smaller in absolute value than a second threshold being a smaller value than the first threshold, to output a signal on determination to have the both-side interpolation as an interpolation at the interpolation pixel data generating step.

* * * * *